United States Patent
Edpalm et al.

(10) Patent No.: US 11,055,856 B2
(45) Date of Patent: Jul. 6, 2021

(54) METHOD FOR AND APPARATUS FOR DETECTING EVENTS

(71) Applicant: AXIS AB, Lund (SE)

(72) Inventors: Viktor Edpalm, Lund (SE); Erik Andersson, Lund (SE)

(73) Assignee: AXIS AB, Lund (SE)

( * ) Notice: Subject to any disclaimer, the term of this patent is extended or adjusted under 35 U.S.C. 154(b) by 22 days.

(21) Appl. No.: 15/851,340

(22) Filed: Dec. 21, 2017

(65) Prior Publication Data
US 2018/0174306 A1  Jun. 21, 2018

(30) Foreign Application Priority Data
Dec. 21, 2016  (EP) .................................... 16205867

(51) Int. Cl.
| | |
|---|---|
| H04N 5/14 | (2006.01) |
| G06K 9/00 | (2006.01) |
| H04N 21/234 | (2011.01) |
| G06T 7/215 | (2017.01) |
| G06T 7/246 | (2017.01) |
| H04N 21/2368 | (2011.01) |

(52) U.S. Cl.
CPC .......... *G06T 7/215* (2017.01); *G06K 9/00369* (2013.01); *G06K 9/00711* (2013.01); *G06T 7/246* (2017.01); *H04N 5/147* (2013.01); *H04N 21/2368* (2013.01); *H04N 21/23418* (2013.01); *G06K 9/00778* (2013.01); *G06K 2009/00738* (2013.01); *G06T 2207/20021* (2013.01); *G06T 2207/30232* (2013.01); *H04N 5/14* (2013.01)

(58) Field of Classification Search
None
See application file for complete search history.

(56) References Cited

U.S. PATENT DOCUMENTS

| | | | |
|---|---|---|---|
| 6,574,279 B1 * | 6/2003 | Vetro | H04L 29/06027 375/240.08 |
| 9,256,955 B2 | 2/2016 | O'Gorman | |

(Continued)

FOREIGN PATENT DOCUMENTS

| | | |
|---|---|---|
| CN | 102136195 A | 7/2011 |
| JP | H0491589 A | 3/1992 |

(Continued)

OTHER PUBLICATIONS

Laumer, Marcus, et al. "A compressed domain change detection algorithm for RTP streams in video surveillance applications." 2011 IEEE 13th International Workshop on Multimedia Signal Processing. IEEE, 2011. (Year: 2011).*

(Continued)

*Primary Examiner* — Vu Le
*Assistant Examiner* — Tracy Mangialaschi
(74) *Attorney, Agent, or Firm* — Volpe Koenig

(57) ABSTRACT

A method for detecting events comprises repeatedly registering a value indicating an amount of data generated by an encoder, which is encoding video from a scene by means of temporal compression, determining if a particular event has occurred in the scene represented by the encoded video by comparing characteristics of the registered values with predetermined characteristics, and generating an event signal in response to an event occurrence being determined.

20 Claims, 2 Drawing Sheets

(56) References Cited

U.S. PATENT DOCUMENTS

| | | | |
|---|---|---|---|
| 9,380,309 B2 | 6/2016 | Huang et al. | |
| 2003/0095686 A1* | 5/2003 | Montgomery | G08B 13/19602 |
| | | | 382/103 |
| 2004/0032982 A1 | 2/2004 | Nishizawa | |
| 2006/0195199 A1 | 8/2006 | Iwasaki et al. | |
| 2007/0198931 A1 | 8/2007 | Ono et al. | |
| 2010/0177963 A1 | 7/2010 | Yokomitsu et al. | |
| 2012/0307915 A1* | 12/2012 | Clark | H04L 43/0829 |
| | | | 375/240.27 |
| 2013/0300940 A1* | 11/2013 | Amon | H04N 5/147 |
| | | | 348/700 |
| 2015/0235379 A1* | 8/2015 | O'Gorman | H04N 5/147 |
| | | | 382/103 |

FOREIGN PATENT DOCUMENTS

| | | |
|---|---|---|
| JP | H10197543 A | 7/1998 |
| JP | 2010140371 A | 6/2010 |
| WO | 2009/012297 A1 | 1/2009 |
| WO | 2012/098078 A2 | 7/2012 |
| WO | 2012/098078 A3 | 7/2012 |

OTHER PUBLICATIONS

Poppe, Chris, et al. "Moving object detection in the H. 264/AVC compressed domain for video surveillance applications." Journal of Visual Communication and Image Representation 20.6 (2009): 428-437. (Year: 2009).*

Babu, R. Venkatesh, and Kalpathi R. Ramakrishnan. "Recognition of human actions using motion history information extracted from the compressed video." Image and Vision computing 22.8 (2004): 597-607. (Year: 2004).*

"Change Detection in JPEG 2000 Compressed Video", Electronic Letters, The Institution of Engineering and Technology, vol. 46, No. 6 (Mar. 18, 2010) pp. 409-411, XP006035287.

EP 16 20 5867.1 European Search Report (dated May 31, 2017).

* cited by examiner

METHOD FOR AND APPARATUS FOR DETECTING EVENTS

BACKGROUND

Most surveillance, monitoring and security systems of today include devices for capturing and generating video. The captured videos are often analyzed for detecting the occurrence of specific events. Examples of such events are motion detection, object detection, and detection of trespassing. Detection of these types of events require a lot of processing power. Such requirements of high processing power may limit the possibility for providing event detection in the low processing power cameras capturing the video. One reason for using less processing power cameras may be that the price for a high processing power equipped camera is higher. Another reason may be that a camera having high processing power requires more electrical power than a camera having less processing power and it may not be possible to provide that amount of electrical power to the position of the camera. Hence, a method for making event detection require less computing power is desired.

SUMMARY

Making event detection require less processing power is performed by a method for detecting events according to claim 1. Further embodiments are presented in the dependent claims.

More specifically, the method for detecting events, according to some embodiments comprises repeatedly registering a value indicating an amount of data generated by an encoder, which is encoding video from a scene by temporal compression, determining if a particular event has occurred in the scene represented by the encoded video by comparing characteristics of the registered values with predetermined characteristics, and generating an event signal in response to an event occurrence being determined. By registering the amount of data generated in the encoding of the video and then using this data for determining if events have occurred in the captured video processing power may be saved due to the fact that the determination may be performed without processing heavy analysis of all image data. There may also be a further advantage in the fact that less data is required for the determination, for example transfer of data for analysis may result in less network load, storage of data for enabling determination of if an event or if a particular event has occurred may require less storage capacity.

In further embodiments the characteristics compared in the act of determining if a particular event has occurred may be any characteristic or any combination of characteristics from a group of characteristics including: the registered values increases at a rate higher than a first predetermined threshold, at least one registered value is higher than a second predetermined threshold, the registered values decreases at a rate larger than a third predetermined threshold, and an integration of values over a time period exceed a fourth predetermined threshold. An advantage with any of these characteristics is that they do not require a lot of processing power or memory in order to be calculated from the registered values indicating the amount of data generated by the encoder.

Moreover, a particular event may be determined and identified by matching a characteristic representing a sequence of registered values to a predetermined event characteristic based on a description representing a sequence of corresponding values. The advantage of matching sequences of registered values may be that more specific events and/or more complex events may be detected and identified.

In yet further embodiments an event is determined by comparing characteristics representing a sequence of registered values to a description representing a normal state and wherein such an event is determined to have occurred if the sequence of registered values differs from the normal state at a degree larger than a predetermined value. The advantage of determining that an event has occurred if the characteristics differ from a normal state characteristic is that the determination may be very effective as detection of many events, even unanticipated events or unknown events, may be detected by comparison to a few characteristics.

According to further embodiments each repeatedly registered value indicating an amount of data generated by an encoder is arrived at by measuring an amount of data transferred including the data generated by the encoder from the time of a previously registered value. Moreover the measuring of data transferred may be performed from the time of the last registered value.

Some embodiments may further include storing registered values in a database, wherein the act of determining if a particular event has occurred is performed on the values registered in the database.

Yet other embodiments may further include transferring registered values over a network to a client, wherein the act of determining if a particular event has occurred is performed by the client.

In some embodiments a characteristic of the registered values that represents an increase in value over time indicates an object entering the scene in the encoded video. The advantage of this feature is that it becomes possible to determine characteristics of more complex events.

In further embodiments a characteristic of the registered values is the value itself and wherein a first object type moving through the scene is identified by comparing the registered value to a predetermined first threshold and wherein a second object type moving through the scene is identified by comparing the registered value to a predetermined second threshold.

According to some embodiments the act of determining if a particular event has occurred is performed only for registered values larger than a predetermined threshold, the advantage of this determination scheme is that it is very simple and requires very low processing power to operate.

In some embodiments values representing data including an image frame that is not temporally encoded are not used in the act of determining if a particular event has occurred. The advantage of not determining events based on non-temporally encoded image frames is that even further processing power is saved without decreasing the precision in the determinations, as the non-temporally encoded frames does not carry any information relating to movement in the video.

In additional embodiments the method further comprises incrementing a counter each time the occurrence of a particular event has been determined. The advantage of this is that a counter, for example, a people counter a vehicle counter, an general object counter, requiring low processing power may be implemented. Such a counter may for instance be implemented in a camera with limited resources or another device with limited resources or at least limited spare resources. In some embodiments the method further comprises incrementing a counter related to a particular event each time the occurrence of that particular event has been determined. Hence there is arranged a counter for specific events, this may result in that separate counters is arranged for different objects, for example people, animals, vehicles, for example or for different events, for example running, walking, leaving objects behind, etc.

A further scope of applicability will become apparent from the detailed description given below. However, it should be understood that the detailed description and specific examples, while indicating preferred embodiments are given by way of illustration only, since various changes and modifications within the scope of the present teachings will become apparent to those skilled in the art from this detailed description. Hence, it is to be understood that these teachings are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages of the present teachings will become apparent from the following detailed description of a presently preferred embodiment, with reference to the accompanying drawings, in which.

Further, in the figures like reference characters designate like or corresponding parts throughout the several figures.

DETAILED DESCRIPTION

Figure 1:
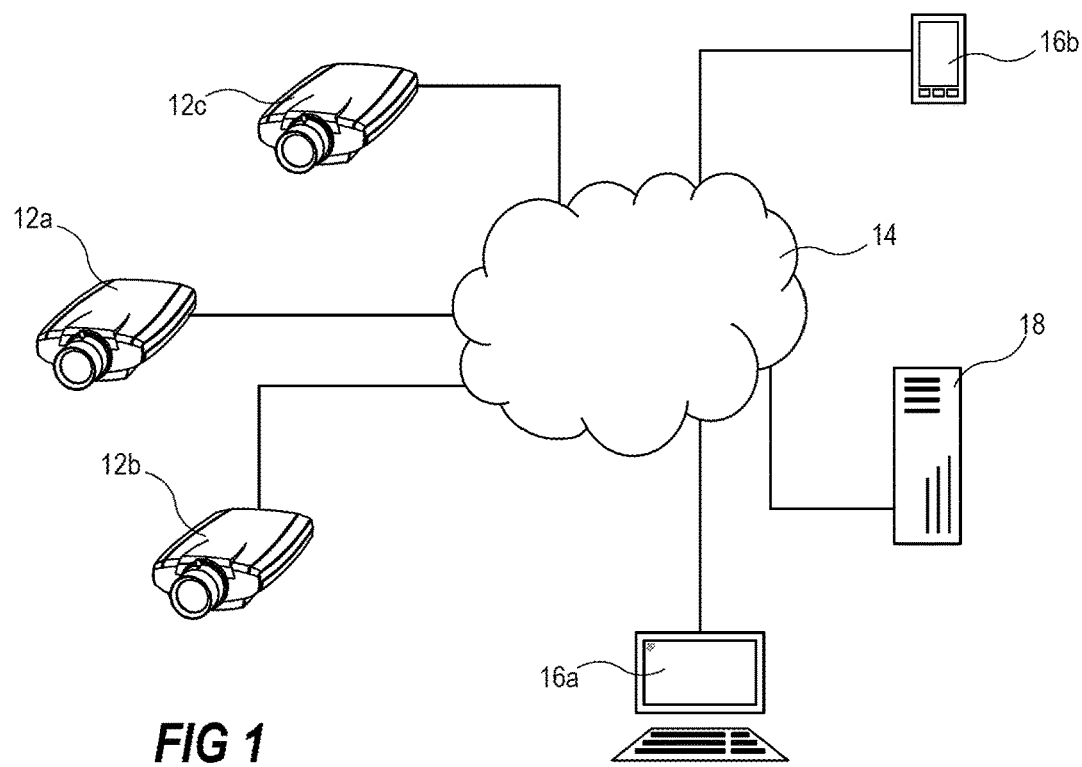
FIG. 1 is a schematic diagram of a system that may include an implementation an embodiment.

An event detection system and to a method for detecting events are described herein. The event detection system may be a system comprising a plurality of monitoring cameras 12 a-c, a communication network 14, system managing devices 16 a-b, and a data storage device 18, see FIG. 1. The monitoring cameras 12 a-c may be any type of networked monitoring cameras which are enabled to capture motion video. The communication network 14 may be any wired or wireless communication network or may be any combination of various wired and/or wireless networks, e.g. LAN, WAN, the Internet, cellular network, Wi-Fi, etc. The system managing devices 16 a-b may be any computing device having a display enabling an operator to interact with a device in the system or receive information relating to event detection. The data storage device 18 may be a network attached storage unit (NAS), a file server, a video server, or any other data storage unit.

Figure 2:
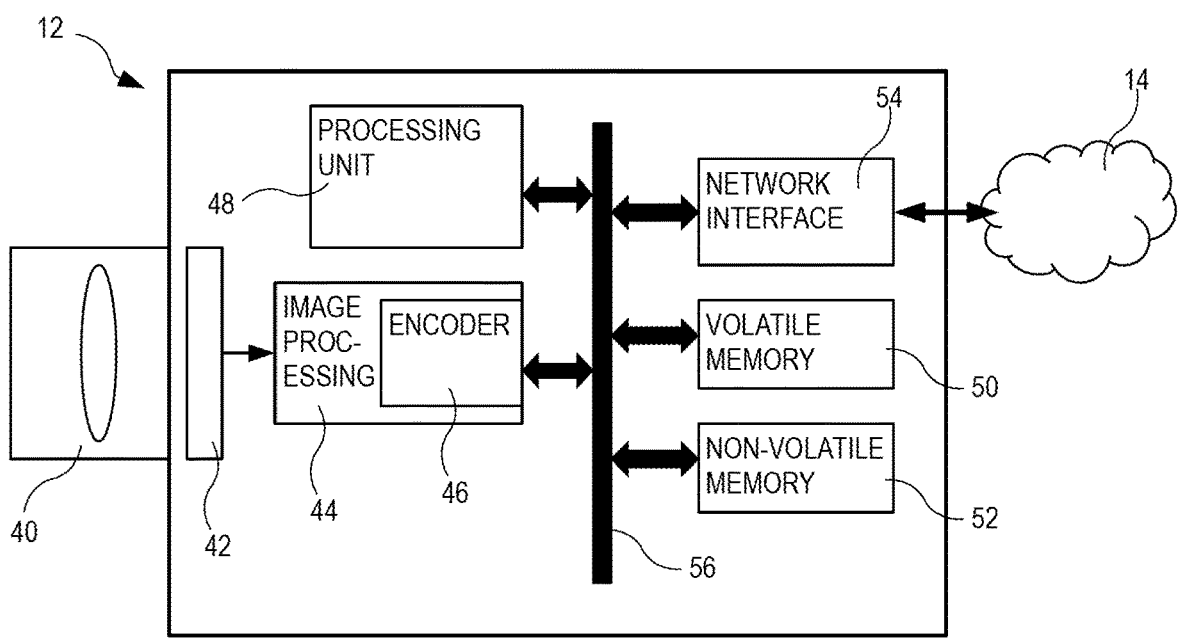
FIG. 2 is a block diagram of a camera according to an embodiment.

Now referring to FIG. 2, a monitoring camera 12 used in the system is arranged to capture motion video of a scene as digital data. Therefore the monitoring camera 12 includes at least one lens 40 directing light from the scene onto an image sensor 42. The image sensor 42 and an image processor 44 converts the light into digital data representing a captured image. Further, the camera 12 is arranged to capture a plurality of images in order to provide data for generating motion video. The data representing the motion video is then encoded in an encoder 46, which is encoding the motion video using a temporal compression scheme. The camera may be a camera capturing visible light, an IR camera, a ToF camera (Time of Flight camera), etc.

A temporal compression scheme is scheme of reducing compressed video size by not encoding each frame as a separate and complete image. The frames that are encoded completely are called intra frames, since these frames are fully encoded based on the information in the presently encoded image frame. All other frames in the video are represented by data specifying a change since the last frame. Thus, the data representing these frames represents differences from other frames. These frames are called delta inter frames as they are depending on data in other frames. The inter frames may be related to the previous frame, referred to as P frame in some encoding schemes, but may alternatively be related to previous and future frames, referred to as B frames.

The encoding of the motion video in the encoder 46 decreases the amount of data that will represent the motion video. Examples of encoding schemes used in the encoder 46 are H.264, H.265, MPEG-2 part two, MPEG-4 part two, etc. In some cameras 12 the motion video is analyzed and/or processed even more before and/or after the encoding of the motion video. In such cameras 12 a processing unit 48 may be arranged for that type of analysis and/or processing. Many of the cameras 12 also require a volatile memory 50 and/or a non-volatile memory 52 for the operation of programs and for storage of data.

Before the motion video is transmitted over the network 14 the video data is managed by a communication protocol and then physically adapted to the network connected to the camera. The network interface 54 in FIG. 2 may be seen as a device or module performing these operations in any way known to the person skilled in the art. The communication between devices and modules in the camera may be implemented by direct individual physical connections or a data bus or a combination of both, these communication implementations are symbolized in FIG. 2 by an internal communication path 56.

The present event detection system is designed to detect events using less processing power than a system analyzing all the pixels of a video stream for detecting an event. When it comes to detecting events in stored data, for example representing older recordings, the event detection in data representing a longer time period will be quicker than when using a system analyzing all the pixels of a video stream for detecting the events. These advantages are achieved by analyzing the amount of data generated by the temporally compressing video encoder 46 of the camera 12 that is capturing motion video of the scene in which event detection is desired. The amount of data generated by the encoder 46 depends on the amount of change between consecutively captured image frames. For example, an image sequence of a scene having essentially no moving objects will result in less encoded data than an image sequence of the scene having a lot of movement. Hence the amount of data after the encoding step depends heavily on variations in consecutively captured images. This may also be described as the amount of encoded image data that being generated by the encoder 46 is dependent on the number of pixels on the image sensor that is affected by the movements in the scene. For instance, an object close to the camera or a big object in the scene will have an impact on more pixels on the image sensor than objects far from the camera or a small object. Accordingly the amount of data is an effect of the temporal compression of the image information.

According to certain embodiments a plurality of data rates, representing the amount of data per unit of time in a data stream including the motion video of the monitored scene, are measured and registered sequentially. Thereby a dataset representing the variation in data rate over time is registered. The data rate may be measured or retrieved from various places in the system. For example the data rate may be measured or retrieved at the encoder 46 of the camera, at the network interface 54 of the camera, at a switch or a router in the network 14, at a network interface or a decoder in a system managing device 16 *a-b*, or at a network interface or a decoder in a networked storage device 18. The data rate may be measured directly on a stream representing the image stream, but may also be measured by measuring the data rate of network packets transmitting the motion video. The process of measuring the data rate of a data stream or any data transmission is well known to the person skilled in the art.

The dataset representing the data rate over time may be represented using a very low amount of data, in particular compared with the data required to represent a motion video stream. For example, consider including in the dataset representing the variation in data rate over time a value or a data entry representing the amount of data used in representing each image in the image stream. If the camera is a ten megapixel camera the size of an intra frame, for example spatially encoded, would be about 2.5 MB, using any of the standard encoders. Even a ten mega pixel frame being encoded using a lossless coding scheme would not have a size much bigger than 10 MB. In order to register a value or a data entry representing every size between 0 MB-10 MB only three bytes will be needed, as three bytes would be able to represent values of over 16 million. In case the resolution of the data rate is not as important it may even be possible to represent the data rate using two or one byte(s). The data needed to represent the data rate in the dataset may easily be almost a million times smaller than the data used for representing one intra frame. In streaming video the data used per frame will of course be smaller, as the inter frames are temporally encoded. However, the data set used may not need to include the size of every frame but may represent the accumulated data amount over a predetermined time period. In one embodiment a frame size is registered as a representation of the data rate. The frame size indicates the amount of data needed to encode a frame. The frame size is registered using 4 bytes (32 bits) and the frame size is registered for each frame. The frames are captured at 30 frames per second, and accordingly the data used by the invention for detection of events may is in this embodiment 0.12 Kb/s. This is much lower than the data rate of a normal motion video stream of 6 000 Kb/s.

Independent of the exact implementation of the encoding of the images in an image stream and of the resolution, for example number of bytes, used in the dataset to represent each value or data entry in the dataset, the difference in amount of data that has to be processed when a data rate dataset may be used instead of images of the image stream is enormous. Another great gain is achieved in respect of storage, as just a fraction of the data need to be stored. For example, a monitoring system may store motion video data for only the time periods where interesting events have occurred and store the data rate values for the entire monitored time period. The stored data rate values may then be searched and/or analyzed in order to filter out particular events. Then the data rate values may also be used in order to confirm that no event occurred for the time periods where no motion video has been stored. Moreover, in general it is advantageous that the stored data rate data set may be used in order to search in recorded video for video sequences of interest. Yet another advantage of analyzing the data rate set is that events in the scene may be analyzed without compromising the integrity of persons present in the scene.

Figure 3:
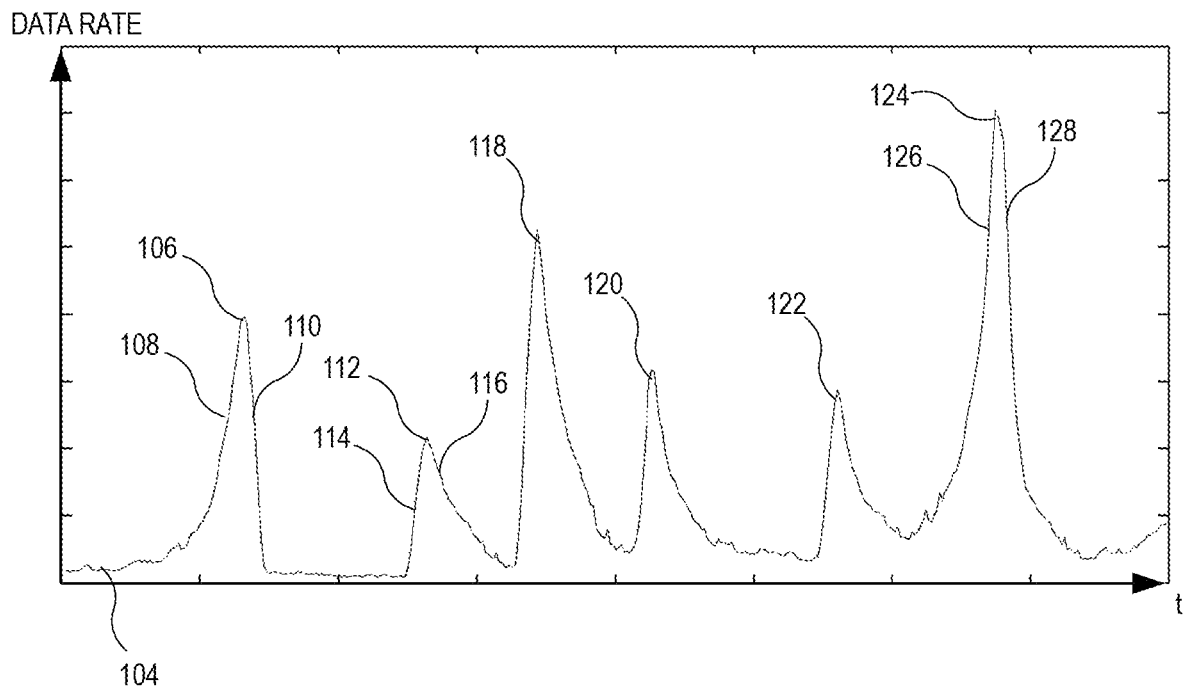
FIG. 3 is a graph representing data rate over time showing features of the graph that may be used an embodiment.

In FIG. 3 an example of a dataset is illustrated by plotting the data rate against time. The dataset of the figure is achieved by registering the amount of data representing each image frame in a video stream captured by a camera. In the present dataset the effect of intra-frames has been removed by simply removing each value representing an intra-frame. The removing of intra-frames may alternatively be implemented as removing all data values above a maximum threshold value. The advantage of removing the intra-frames is that the data rates will become simpler to analyze when a peak in data rate for each intra-frame does not need to be considered. Especially as the intra frame does not contribute with information relating to movement or changes between frames, because the intra frame is spatially encoded and not temporally encoded. In this way the dataset will utilize the inherent movement indication of inter-frames in temporal encoders without interference from the high data amount value of the intra-frames.

The scene monitored resulting in the graph of FIG. 3 is a road and the camera is arranged to capture video from above the road in the longitudinal direction of the road. Various events may be identified by simply looking at the graph. For instance the height of each peek identifies the size of the vehicle, at least the relative size of the vehicle, when it passes by the camera at the closest point. Hence, it is possible to draw conclusions to the size of vehicles passing by the camera by simply focus on peak values in the graph. Moreover, the steepness of the graphs on each side of the peak reveals the travel direction of the vehicle. The steep portion of the graph is the result of the camera encoding video of a vehicle leaving the scene or arriving at the scene at a point close to the camera, for example, leaving or arriving in the scene when the image captured of the vehicle is big, resulting in a lot of pixels changing in a short amount of time due to the vehicle. The less steep portion of the graph on the other side of the peak is a result of a vehicle traveling towards the camera from far away in the captured scene or driving away from the camera in the scene. This is a result of the vehicle being in the scene for a relatively long time and is slowly being perceived as smaller and smaller the further away from the camera it is.

Now referring to the graph 104 in FIG. 3, the first peak 106 would, from the above reasoning, represent a large car, e.g. a van or a truck, driving towards the camera. This is deduced from the looks of the graph where the portion of the graph 108 leading up to the peak 106 may be identified as representing a vehicle travelling a long time in the scene until it reaches the position close to the camera and thereby resulting in a less steep graph. The fact that the less steep portion of the graph 108 is registered before the top of the peak 106 of the graph indicates that the vehicle is travelling in the scene towards the camera. Accordingly, the portion of the graph 110 that is on the later side of the peak is steep indicating that the vehicle is leaving the scene close to the camera, as discussed above.

The second peak 112 represents a car driving away from the camera in the scene. The size of the car represented by the height of the peak 112 and the travel direction identified by having the steep portion of the graph 114 leading up to the peak 112 and the less steep portion of the graph 116 after the peak. Peak 118 represents another large vehicle travelling away from the camera while peaks 120 and 122 each probably representing a car travelling away from the camera.

The last peak 124 of the graph 104 is higher than the peaks representing large vehicles and when looking at the steepness of the portions of the graph 126, 128, on each side of the peak 124 you find that both portions are less steep. These indications make it possible to conclude that the peak represents two vehicles that are travelling in the opposite direction of each other.

Accordingly, features of the graph 104 representing the data rate of the temporally encoded video data may be used in order to identify or at least indicate particular events. For example a threshold value may be set up to indicate an event like movement in the scene, for example the event is triggered if the data rate exceeds the threshold. Event representing objects travelling towards the camera or away from the camera may be identified by analyzing the derivative of the portions of graphs on each side of a peak, for example calculating the steepness of these portions of the graph as explained above. Such a steepness value, for example the gradient, may also be used to indicate a velocity event, for example the speed of an object could be calculated based on the steepness of the graph. The area under the graph may also be used in analyzing the events. The area may be used to determine the speed of a vehicle, a size of a vehicle, and plenty of other things.

Yet another alternative is to generate models representing various events that is identifiable in a graph representing the data rate against time and then by using these models identifying particular events. Such models may be formed by identifying and registering a combination of particular characteristics of a portion of the graph representing a particular event or by registering a typical event and identifying an event as this event if a registered graph does not divert from the registered typical graph more than a predetermined amount. The models may also be formed by using deep learning, for example by training a neural network into identifying specific events by the input of the data rate of the temporally encoded video.

Yet another application is to create a model that represents events that normally should occur in the scene and then trigger an alarm when the registered data rate diverts from this model. For example, the system may be used for surveying a railway track. A model representing trains passing by on the track is formed, either by analyzing characteristics of the graph or by training the system using a neural network approach. Then the system may be set up to indicate when an event not fitting the model is detected. Hence, this could be used to detect animals or people on the track as the data rate graph of events like animals or humans on the track is very likely to differ significantly from the model representing the trains.

The data rate analysis for detection of events may be used in many applications. As mentioned above it may be used in traffic surveillance and in monitoring of train tracks. Other areas of use is in monitoring of processes in factories, for example counting products on conveyer belts, generate alarm if the some or a plurality of characteristics of a data rate series, for example data rate over time, or a section or sections of such data rate series differs from a "normal" characteristic or section, for example indicating a discrepancy from the intended process, etc. As mentioned above the characteristics may be represented by specific data points, for example data rate value, gradient, area, and a section may be represented by a shape of the graph over that time period. Further, the method of detecting events may be used in surveillance of building or premises for detecting suspicious and or hazardous activities. This method of detecting events may also be used for controlling building automation systems such as lighting, heating, ventilation, etc.

The above use cases are presented using live data rates from the camera or cameras. However, the data rate data may also advantageously be stored for later analysis. The data does not require much storage and may be very useful in situations when you would like to find a time point for a particular event in order to study the video of that event. In this particular case the video would be available, however, the data rate data is much more efficient to search for events as it is much less data to analyze. Therefore it is a great advantage to store and use the data rate information for later use.

Figure 4:
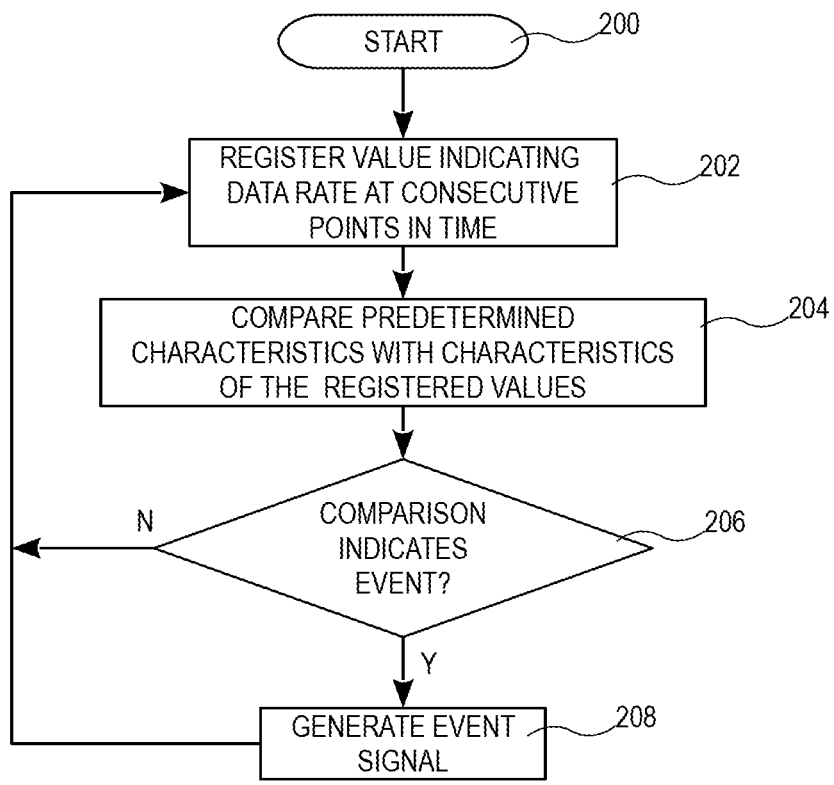
FIG. 4 is a flowchart of a process for generating event signals according to an embodiment.

Now referring to the flowchart of FIG. 4 depicturing a process 200 of embodiments of the invention. The process includes registering consecutive values each indicating the data rate from a particular point in time, step 202. These values may be based on information provided by the encoder in the camera, values achieved by measuring the amount of data outputted from the encoder, values provided by the network interface, for example network traffic, etc. Each value and/or series of values represents characteristics of the registered values, as presented in the examples above, and are compared with corresponding predetermined characteristics representing at least one event, step 204. If the comparison indicates that a value or a series of values represent an event, step 206, then an event signal is generated, step 208, and then the process returns to step 202 for registering additional values indicating the data rate of the data generated by the encoder. An event signal may be an internal signal or a signal transmitted to other systems or devices. For instance may the signal indicate an event representing detection of an object, this signal may be sent internally to a counter in order to count number of objects. Moreover the event signal may be a signal carrying data of the event, for example a vehicle of medium size passed by in an westerly direction at 60 km/h. Further, the event signal may be an alarm signal. The skilled person would realize the multitude of variations of event signals. If the comparison does not indicate any occurrence of an event, step 206, then the process returns directly to step 202 in for registering additional values indicating the data rate of the data generated by the encoder. This process may be performed on live data, for example as the data is produced and the values are generated, or it may be performed on stored data, for example the data is stored in some storage device and parsed in order to detect events in the stored data.

The comparison in step 204, may include any one of or any combination of the characteristics discussed in connection with the data rate graph of FIG. 3. For example may the characteristic compared be the value of the data rate that is being compared to a threshold indicating whether there is enough changes in the scene in order to trigger a motion event. The characteristic may be the derivative, for example the steepness, of changes related to a single data entry or a plurality of consecutive data rate values in the graph. Such a derivative may be compared to a predetermined threshold in order to indicate an event. Another, characteristic that may be compared is an integral of values of data rate, for example area under the graph. Such an area may be measured between two time points where the data rate exceeds a threshold or simply over a predetermined time frame. The comparison may include comparing a set of characteristics with a predetermined set of characteristics, for example any combination of the above mentioned characteristics. Moreover, a set of characteristics could include a plurality of characteristics from different points in time. For example, an event indicating that a car is driving towards or away from the camera may be detected by detecting a first derivative, then a peak value and at last the second derivative. This set of characteristic values may then be compared to a set of predetermined characteristics.

Moreover, the system may be implemented by arranging all the functionality of the system in a camera, for example the camera includes the means for performing the process according to embodiments of the invention. For example, the camera 12 retrieves the data rate values from the encoder 46, from the network interface, or from any other data rate extraction point in the camera, and store data rate values in a memory 50, 52 for comparison with characteristics set in a program executed by the camera for detecting events live or from historical data rates. The camera may then transmit an event identifier in response to an event detection.

Alternatively, the system may be implemented in any of the devices connected to the camera via the network and receiving streaming motion video. Such a device, for example a system management device 16a-b, a data storage device 18, etc., may measure the amount of data received in the motion video stream and execute the process on its own. The device could also be a storage device such as a file server, a NAS, etc. which is arranged to store the data rate retrieved from measuring on the data received for storing or data rates retrieved at another location.

In a further alternative the operation of the system is distributed over various devices. For example, the camera 12 may measure and generate the data rate values and send them to the storage device 18 for storage and to the system managing device 16a-b for live event detection. The system management device 16a-b may then also be arranged to retrieve historical data rate values stored at the storage device and analyze them for event detection.

The characteristics of data rate values and data rate value series representing events occurring in a scene may be very dependent upon the perspective captured by the camera, for example if the camera is directed from above and in the longitudinal direction of a road or a path or if the camera is mounted to capture a scene where passers-by are travelling from left to right in the image. Accordingly the perspective of the camera may dictate the type of events that are possible to detect.

The examples above are all given in relation to a stationary camera, however the camera may be a mobile camera as well. For instance may the camera be mounted in a drone or an UAV (Unmanned Aerial Vehicle) or it could be a dashboard camera in a vehicle.

Moreover, the event detection may be used in systems where privacy masks is arranged in order to protect the privacy of people. The event detector according to the invention could analyze the entire scene in order to generate events without giving away any personally identifiable information.

What is claimed is:

1. Method for detecting events, comprising:
   measuring a data rate of an encoded video stream of a scene that has been encoded by temporal compression over a plurality of consecutive time intervals to generate a plurality of values corresponding to each of the consecutive time intervals;
   removing all of the plurality of values that correspond to image frames that are not temporally encoded to generate a dataset; and
   detecting events representing objects traveling towards or away from a camera used for capturing the scene by comparing a derivative of portions on both sides of a peak of a representation of the data rate against time of the dataset.

2. The method according to claim 1, further including storing the dataset in a database, wherein the act of detecting events is performed on the dataset stored in the database.

3. The method according to claim 1, further including transferring the dataset over a network to a client, wherein the act of detecting events is performed by the client.

4. The method according to claim 1, further comprising indicating a velocity of an object triggering a detection of an event by analyzing steepness of the portions of the representation of the data rate against time of the dataset.

5. The method according to claim 1, further comprising identifying a size of an object triggering a detection of an event by analyzing a height of the peak.

6. The method according to claim 1, further comprising incrementing a counter each time the occurrence of an event has been detected.

7. The method according to claim 1, further comprising incrementing a counter related to a particular event each time the occurrence of that particular event has been identified.

8. The method according to claim 1, wherein the removing all of the plurality of values that correspond to image frames that are not temporally encoded comprises removing all values from the first dataset that are above a maximum threshold value.

9. A method for detecting events, the method comprising:
   measuring a data rate of an encoded video stream of a scene that has been encoded by temporal compression over a plurality of consecutive time intervals to generate a plurality of values corresponding to each of the consecutive time intervals;
   removing all of the plurality of values that correspond to image frames that are not temporally encoded to generate a dataset;
   detecting an event by analyzing a representation of the data rate against time of the dataset; and
   indicating a velocity of an object triggering a detection of an event by analyzing steepness of a portion of the representation of the data rate against time of the dataset.

10. The method according to claim 9, further including storing the dataset in a database, wherein the act of detecting events is performed on the dataset stored in the database.

11. The method according to claim 9, further including transferring the dataset over a network to a client, wherein the act detecting events is performed by the client.

12. The method according to claim 9, further comprising incrementing a counter each time the occurrence of an event has been detected.

13. The method according to claim 9, further comprising incrementing a counter related to a particular event each time the occurrence of that particular event has been identified.

14. The method according to claim 9, wherein the removing all of the plurality of values that correspond to image frames that are not temporally encoded comprises removing all values from the first dataset that are above a maximum threshold value.

15. A method for detecting events comprising:
    measuring a data rate of an encoded video stream of a scene that has been encoded by temporal compression over a plurality of consecutive time intervals to generate a plurality of values corresponding to each of the consecutive time intervals;

removing from all of the plurality of values that correspond to image frames that are not temporally encoded to generate a dataset;

detecting an event by analyzing a peak of a representation of the data rate against time of the dataset; and identifying a size of an object triggering a detection of an event by analyzing a height of the peak.

16. The method according to claim 15, further including storing the dataset in a database, wherein the act of detecting events is performed on the dataset stored in the database.

17. The method according to claim 15, further including transferring the dataset over a network to a client, wherein the act detecting events is performed by the client.

18. The method according to claim 15, further comprising incrementing a counter each time the occurrence of an event has been detected.

19. The method according to claim 15, further comprising incrementing a counter related to a particular event each time the occurrence of that particular event has been identified.

20. The method according to claim 15, wherein the removing all of the plurality of values that correspond to image frames that are not temporally encoded comprises removing all values from the first dataset that are above a maximum threshold value.

* * * * *